US007549329B1

(12) United States Patent
Yu et al.

(10) Patent No.: US 7,549,329 B1
(45) Date of Patent: Jun. 23, 2009

(54) TIRE PRESSURE DETECTING VALVE STEM

(75) Inventors: Hung-Chih Yu, Taichung (TW);
Feng-Yi Chang, Taichung Hsien (TW)

(73) Assignee: Orange Electronic Co., Ltd., Tanzih Hsiang, Taichung Hsien (TW)

( * ) Notice: Subject to any disclaimer, the term of this patent is extended or adjusted under 35 U.S.C. 154(b) by 0 days.

(21) Appl. No.: 12/047,669

(22) Filed: Mar. 13, 2008

(51) Int. Cl.
*G01M 17/02* (2006.01)
*B60C 23/02* (2006.01)

(52) U.S. Cl. .................. 73/146.5; 73/146; 73/146.3; 73/146.8

(58) Field of Classification Search .......... 73/146–146.8
See application file for complete search history.

(56) References Cited

U.S. PATENT DOCUMENTS

| | | | | |
|---|---|---|---|---|
| 5,581,023 A | * | 12/1996 | Handfield et al. | .......... 73/146.5 |
| 6,630,885 B2 | * | 10/2003 | Hardman | .......... 340/505 |
| 6,888,449 B2 | * | 5/2005 | Lin et al. | .......... 340/442 |
| 6,958,684 B2 | * | 10/2005 | Lin et al. | .......... 340/447 |
| 7,281,421 B2 | * | 10/2007 | Yin et al. | .......... 73/146.8 |
| 7,284,418 B2 | * | 10/2007 | Yin et al. | .......... 73/146.8 |

* cited by examiner

*Primary Examiner*—Andre J Allen
*Assistant Examiner*—Jermaine Jenkins
(74) *Attorney, Agent, or Firm*—patenttm.us

(57) ABSTRACT

A tire pressure detecting valve stem has a case, a body and a tire pressure detector. The case is rectangular and has an inner surface. The body is a valve stem and is integrally and transversely mounted on the case and has an inner section and a center pin. The inner section is integrally mounted in the case. The center pin is conductive, is coaxially mounted in the inner section and protrudes from the inner surface of the case. The tire pressure detector corresponds to and is mounted on the inner surface and is electronically connected to the center pin. Because the case is integrally and compactly mounted on the inner section of the body, the case will be mounted on and stay close to a rim when the body is mounted through the rim.

8 Claims, 5 Drawing Sheets

TIRE PRESSURE DETECTING VALVE STEM

BACKGROUND OF THE INVENTION

1. Field of Invention

The present invention relates to a valve stem, and more particularly to a valve stem being integrally mounted with a tire pressure detector.

2. Description of the Related Art

Car electronics have far improvement recently because people care about driving safety more and more nowadays. For instance, a tire pressure monitoring system (TPMS) is applied for monitoring air pressure inside tires of a vehicle. With reference to FIG. 5, a conventional tire pressure detector (62) of the TPMS is mounted on a valve stem (64) that is securely mounted on a rim (68) of a tire (69). The tire pressure detector (62) continuously detects tire pressures inside the tire (69) and transmits wireless signals corresponding to the tire pressures to the TPMS to notice a driver who drives the vehicle.

However, the conventional tire pressure detector (62) is easily to be damaged by the tire (69) since the tire pressure detector (62) protrudes out an annular edge (682) of the rim (68) after being mounted on the valve stem (64). When the tire (69) is pressed under suffering impact or having a puncture, the tire pressure detector (62) may be crashed by an inner surface of the tire (69).

The present invention provides a tire pressure detecting valve stem to obviate or mitigate the shortcomings of the conventional tire pressure detector.

SUMMARY OF THE INVENTION

The primary objective of the present invention is to provide a tire pressure detecting valve stem that has a flat tire pressure detector being integrally mounted on the valve stem and being close to a rim when the valve stem is mounted on the rim.

The tire pressure detecting valve stem has a case, a body and a tire pressure detector. The case is rectangular and has an inner surface. The body is a valve stem and is integrally and transversely mounted on the case and has an inner section and a center pin. The inner section is integrally mounted in the case. The center pin is conductive, is coaxially mounted in the inner section and protrudes from the inner surface of the case. The tire pressure detector corresponds to and is mounted on the inner surface and is electronically connected to the center pin. Because the case is integrally and compactly mounted on the inner section of the body, the case will be mounted on and stay close to a rim when the body is mounted through the rim.

Other objectives, advantages and novel features of the invention will become more apparent from the following detailed description when taken in conjunction with the accompanying drawings.

DETAILED DESCRIPTION OF THE INVENTION

Figure 1:
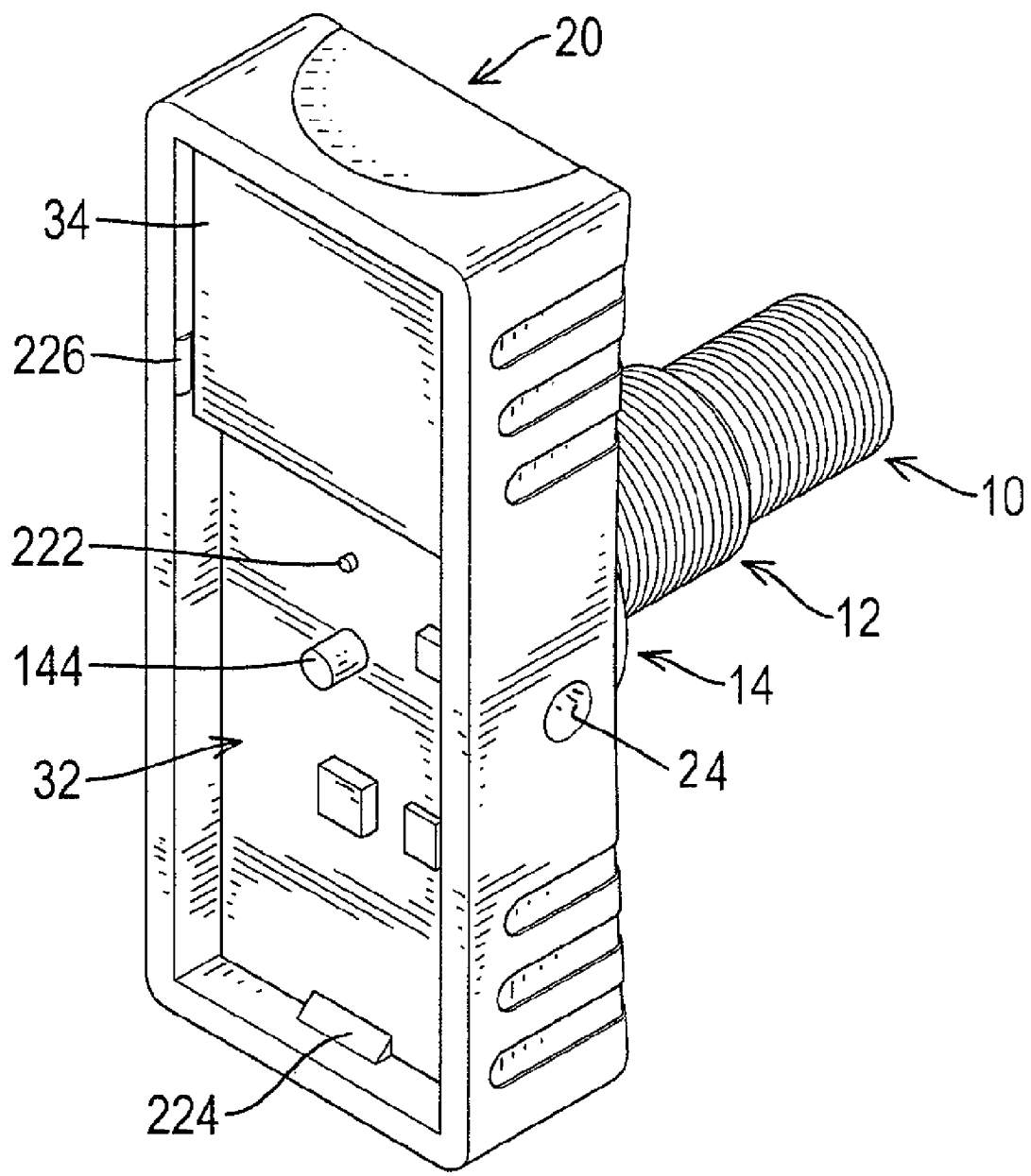
FIG. 1 is a perspective view of a tire pressure detecting valve stem in accordance with the present invention.
Figure 2:
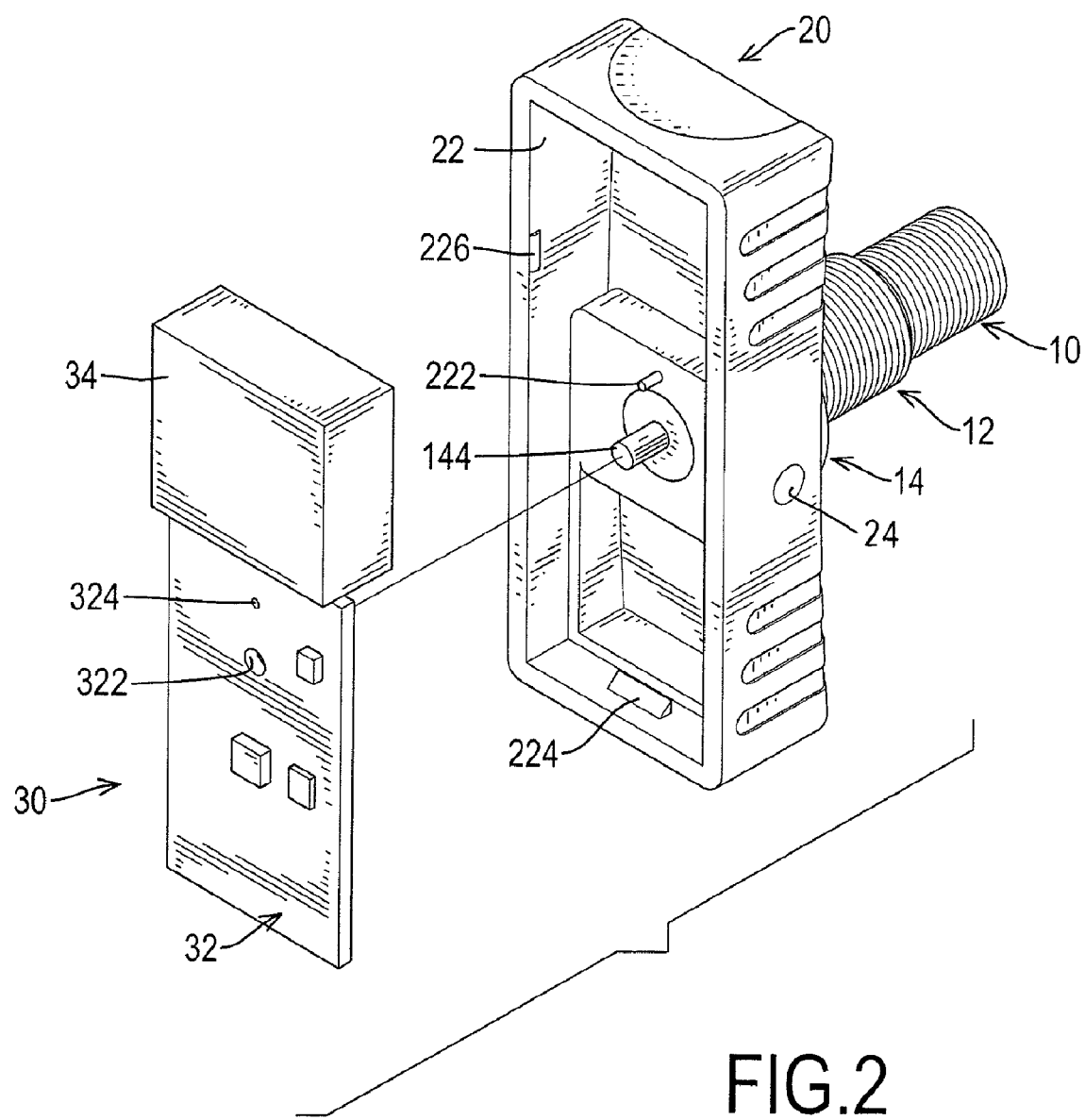
FIG. 2 is a partially exploded perspective view of the tire pressure detecting valve stem in FIG. 1.
Figure 3:
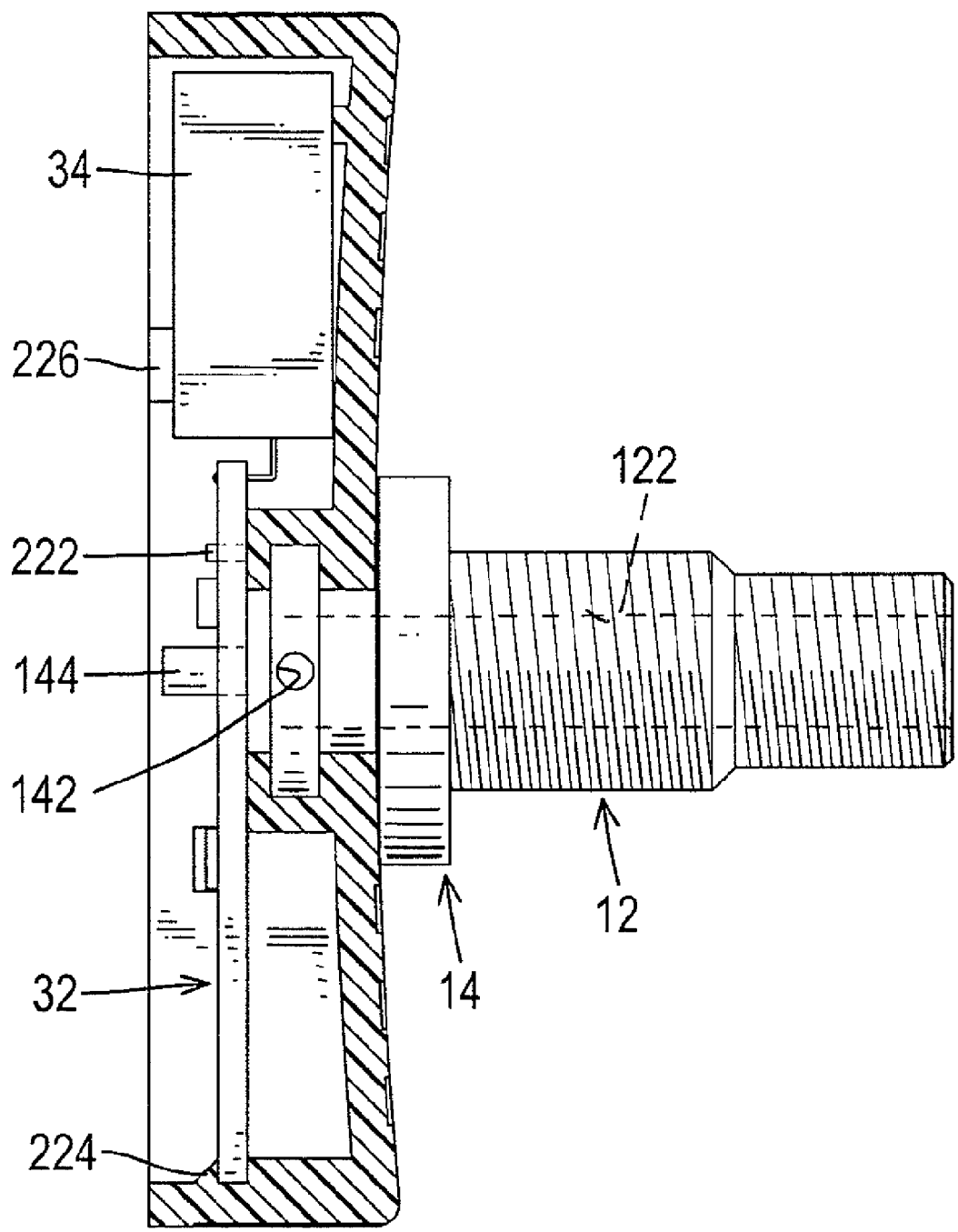
FIG. 3 is a side view in partial section of the tire pressure detecting valve stem in FIG. 1.

With reference to FIGS. 1, 2 and 3, a tire pressure detecting valve stem in accordance with the present invention comprises a case (20), a body (10) and a tire pressure detector (30).

The case (20) is rectangular and has an inner surface (22), an outer surface and an air outlet hole (24).

The inner surface (22) has a bottom surface and an annular surface and may have a position pin (222), a detector module clipping rib (224) and a battery clipping rib (226).

The annular surface surrounds and is perpendicularly formed around the bottom surface.

The position pin (222) protrudes from the bottom surface of the inner surface (22). The detector module clipping rib (224) and the battery clipping rib (226) protrude from the annular surface of the inner surface (22) independently.

The air outlet hole (24) is formed through the annular surface of the inner surface (22).

The body (10) is a valve stem, is integrally and transversely mounted on the case (20) and has an outer section (12) and an inner section (14).

The outer section (12) has an air passage (122).

The air passage (122) is coaxially formed through the outer section (12).

The inner section (14) is integrally and coaxially formed on the outer section (12), is integrally and transversely mounted in the case (20) and has an outlet hole (142) and a center pin (144).

The outlet hole (142) is formed in the inner section (14), communicates with the air passage (122) and corresponds to and communicates with the air outlet hole (24).

The center pin (144) is conductive, may be a copper pin or an aluminum pin and is coaxially mounted on the inner section (14) and protrudes from the inner surface (22).

The tire pressure detector (30) corresponds to and is mounted on the inner surface (22) and has an electrical module (32) and a battery (34).

The electrical module (32) is a tire pressure detecting electrical model comprising electronic devices being electronically mounted on a printed circuit board (PCB), instantaneously detects tire pressures, is electronically mounted with the center pin (144) via the PCB, sends wireless signals corresponding to the tire pressures via the center pin (144) to a tire pressure monitoring system being placed inside a vehicle for informing a person who drives the vehicle. The electrical module (32) is located on the inner surface (22), is clipped by the detector module clipping rib (224) and has an antenna hole (322) and a position hole (324).

The antenna hole (322) is formed through the PCB of the electrical module (32), corresponds to and mounts around the center pin (144) thereby the center pin (144) is capable of electronically connecting to the electrical devices of the electrical module (32) via the PCB and be an antenna for the electrical module (32).

The position hole (324) is formed through the PCB of the electrical module (32), corresponds to and is mounted around the position pin (222) to prevent rotation of the electrical module (32) in the case (20).

The battery (34) corresponds to and is mounted on the inner surface (22), is clipped by the battery clipping rib (226) and is electronically connected to the electrical devices of the electrical module (32) via the PCB.

Figure 4:
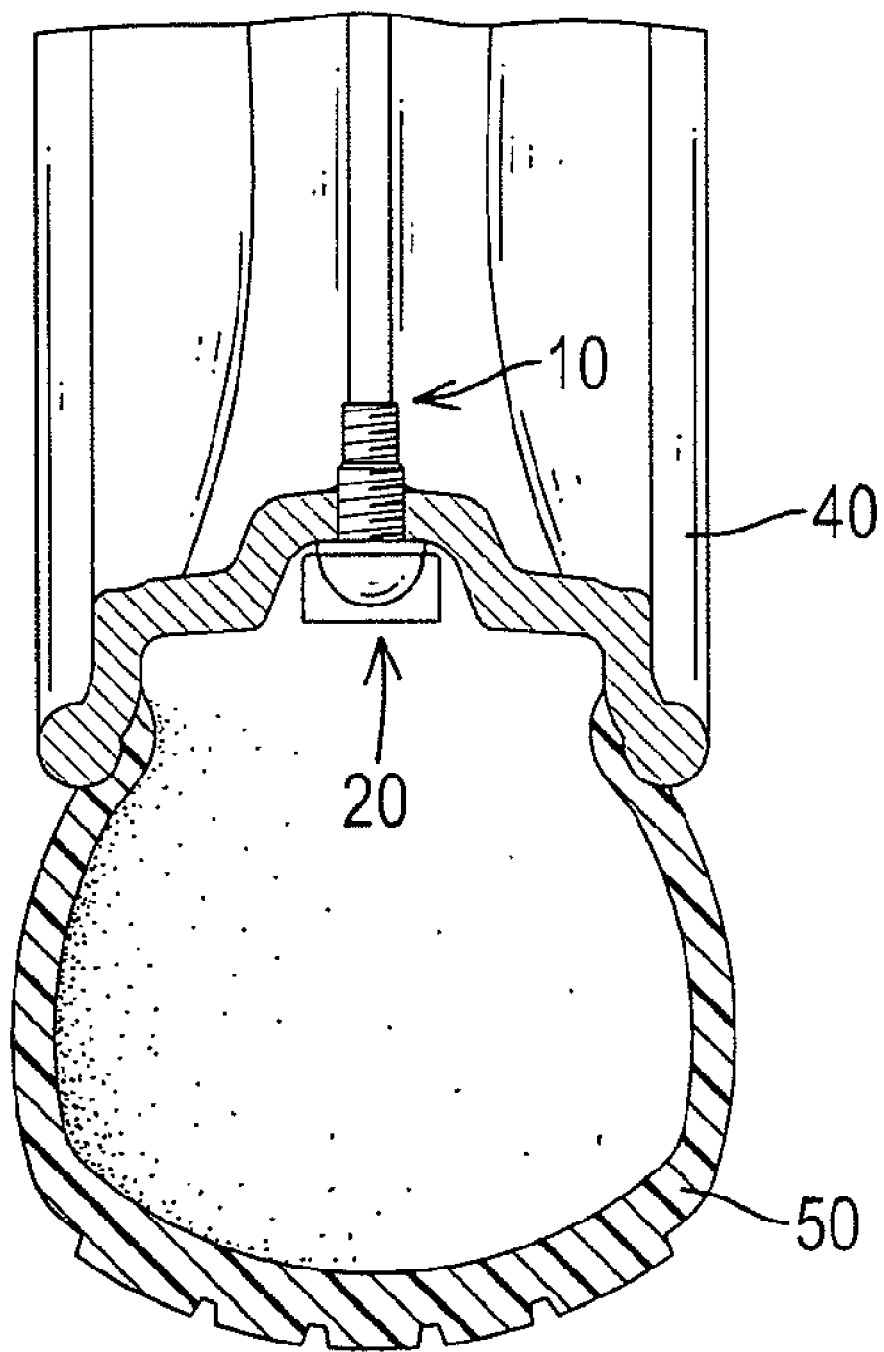
FIG. 4 is an operational side view in partial section of the tire pressure detecting valve stem in accordance with the present invention.
Figure 5:
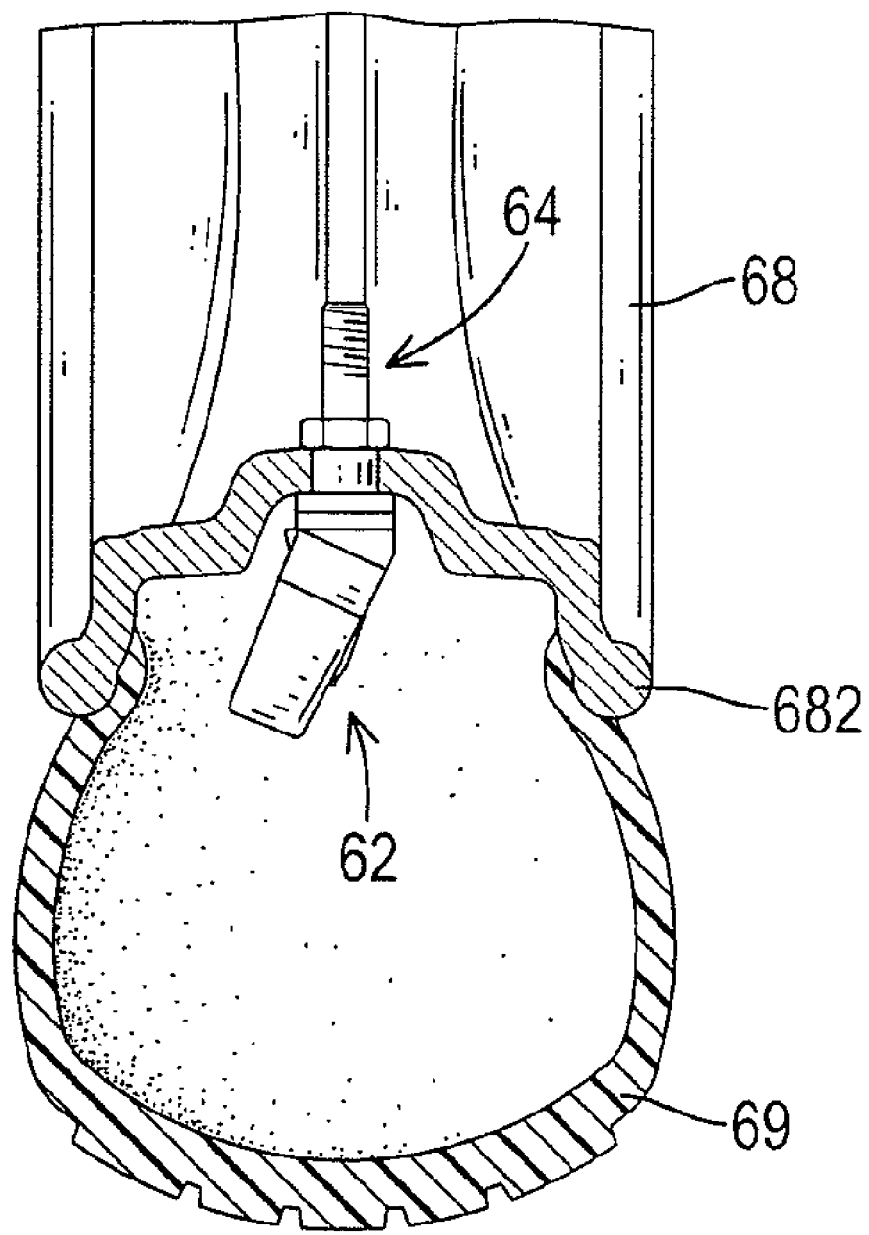
FIG. 5 is an operational side view in partial section of a conventional tire pressure detector mounted on a valve stem in accordance with the prior art.

With reference to FIG. 4, because of the case (20) is compactly and integrally mounted transversely on the body (10), the case (20) is capable of being mounted on and staying close to a rim (40) of a tire (50) to prevent damages occurring from the pressed tire (50).

On the other hand, vibration damages of the tire pressure detector (30) in the case (20) will be efficiently reduced since the tire pressure detector (30) is securely mounted in the case (20) without any movement and rotation by the center pin (144), the position pin (222), the detector module clipping rib (224) and the battery clipping rib (226).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A tire pressure detecting valve stem comprising:
   a case being rectangular and having
      an inner surface having
         a bottom surface; and
         an annular surface surrounding and being perpendicularly formed around the bottom surface;
      an outer surface; and
      an air outlet hole being formed through the annular surface of the inner surface;
   a body being a valve stem, being integrally and transversely mounted on the case and having
      an outer section having an air passage being coaxially formed through the outer section;
      an inner section being integrally and coaxially formed on the outer section, being integrally and transversely mounted in the case and having
         an outlet hole being formed in the inner section, communicating with the air passage and corresponding to and communicating with the air outlet hole; and
         a center pin being conductive and being coaxially mounted on the inner section and protruding from the inner surface; and
   a tire pressure detector being mounted on the inner surface of the case and having
      an electrical module being a tire pressure detecting module comprising electronic devices being electronically mounted on a printed circuit board (PCB), instantaneously detecting tire pressures, being electronically mounted with the center pin, sending wireless signals corresponding to the tire pressure, being located on the inner surface of the case and having
         an antenna hole being formed through the PCB of the electrical module and mounting around the center pin; and
      a battery being mounted on the inner surface and being electronically connected to the electrical devices of the electrical module via the PCB.

2. The tire pressure detecting valve stem as claimed in claim 1, wherein the electrical module is electronically connected to the center pin via the PCB and sends the wireless signals via the center pin.

3. The tire pressure detecting valve stem as claimed in claim 2, wherein the inner surface of the case further has
   a position pin protruding from the bottom surface of the inner surface;
   a detector module clipping rib protruding from the annular surface of the inner surface and clipping the electrical module; and
   a battery clipping rib protruding from the annular surface of the inner surface and clipping the electrical module; and
   the electrical module has a position hole being formed through the PCB of the electrical module and mounted around the position pin.

4. The tire pressure detecting valve stem as claimed in claim 3, wherein the center pin is a copper pin.

5. The tire pressure detecting valve stem as claimed in claim 3, wherein the center pin is an aluminum pin.

6. The tire pressure detecting valve stem as claimed in claim 1, wherein the inner surface of the case further has
   a position pin protruding from the bottom surface of the inner surface;
   a detector module clipping rib protruding from the annular surface of the inner surface and clipping the electrical module; and
   a battery clipping rib protruding from the annular surface of the inner surface and clipping the electrical module; and
   the electrical module has a position hole being formed through the PCB of the electrical module and mounted around the position pin.

7. The tire pressure detecting valve stem as claimed in claim 6, wherein the center pin is a copper pin.

8. The tire pressure detecting valve stem as claimed in claim 6, wherein the center pin is an aluminum pin.

* * * * *